United States Patent
Wirth

(10) Patent No.: US 7,051,847 B2
(45) Date of Patent: May 30, 2006

(54) BRAKE LINING FOR THE DISK BRAKE OF A VEHICLE

(75) Inventor: Xaver Wirth, Ismaning (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 0 days.

(21) Appl. No.: 10/514,425

(22) PCT Filed: May 14, 2003

(86) PCT No.: PCT/EP03/05035

§ 371 (c)(1),
(2), (4) Date: Nov. 16, 2004

(87) PCT Pub. No.: WO03/098068

PCT Pub. Date: Nov. 27, 2003

(65) Prior Publication Data

US 2005/0173210 A1   Aug. 11, 2005

(30) Foreign Application Priority Data

May 16, 2002  (DE) ................................ 102 21 687
Dec. 16, 2002  (DE) ................................ 102 58 750

(51) Int. Cl.
*F16D 65/00* (2006.01)

(52) U.S. Cl. ............. 188/250 G; 188/73.1; 188/250 E; 188/250 B; 188/259

(58) Field of Classification Search ............... 188/73.1, 188/250 G, 73.2, 217, 250 E, 250 B, 250 R, 188/259

See application file for complete search history.

(56) References Cited

U.S. PATENT DOCUMENTS

| 2,943,713 | A |   | 7/1960 | Salak et al. |
|-----------|---|---|--------|--------------|
| 4,535,874 | A |   | 8/1985 | Pollinger et al. |
| 4,640,390 | A |   | 2/1987 | Saumweber et al. |
| 4,901,823 | A | * | 2/1990 | Chang ........................ 188/73.1 |
| 5,538,108 | A |   | 7/1996 | Russo |
| 5,934,418 | A | * | 8/1999 | Wirth ........................ 188/73.1 |

FOREIGN PATENT DOCUMENTS

| DE | 85 14 607 | 8/1985 |
|----|-----------|--------|
| DE | 43 01 006 | 7/1994 |
| DE | 197 09 962 | 10/1998 |
| DE | 298 21 113 | 4/1999 |
| EP | 0 263 752 | 4/1988 |
| EP | 0 784 761 | 7/1997 |
| EP | 1 167 806 | 1/2002 |
| EP | 1 318 321 | 6/2003 |

* cited by examiner

*Primary Examiner*—Melanie Torres
(74) *Attorney, Agent, or Firm*—Barnes & Thornburg LLP

(57) ABSTRACT

A brake lining for the disk brake of a vehicle, especially a rail vehicle, comprising a carrier plate on which several friction elements are secured, whereby said elements can be pressed against the friction surface of a brake disk when the brake is actuated, such that the carrier plate can be partially elastically deformed in the overlapping area of the friction elements or such that a spring element is allocated to each friction element and is supported on the rear of the friction element and on the carrier plate on the side thereof facing the friction element.

26 Claims, 6 Drawing Sheets

BRAKE LINING FOR THE DISK BRAKE OF A VEHICLE

BACKGROUND AND SUMMARY OF THE DISCLOSURE

The present disclosure relates to a brake pad for a disc brake of a vehicle.

For vehicles, particularly rail vehicles, which reach high speeds, brake pads are used whose friction elements consist of a hard material.

In order to achieve a satisfactory contact pattern, that is, a uniform surface pressure of the friction elements on the friction surface of the brake disc, various constructive solutions are known.

Thus, cup springs are used, for example, which are supported on the back of the carrier plate and by which the connected friction elements are elastically disposed on the carrier plate. In another construction, the friction elements are elastically guided on spiral springs, while, according to another suggestion, the friction elements are connected with deformable intermediate metal sheets.

A so-called isobar brake pad is known from European Patent Document EP 0 784 761 B1 (corresponding to U.S. Pat. No. 5,934,418) as well as German Patent Document DE 197 09 962 C1. In this case, the friction elements have spherical-segment-shaped areas on their side facing the carrier plate, which spherical-segment-shaped areas rest in ball sockets of the carrier plate adapted thereto. In the last-mentioned prior art, the friction elements, which otherwise have a hexagonal base, are held by tension springs which are supported on the back of the carrier plate.

In the case of the known brake pads, problems arise because of the relatively high-expenditure and cost-intensive production and a frictional behavior of the friction elements respectively. The frictional behavior is not quite sufficient because of the poor contact pattern despite the constructive measures carried out.

It is therefore an object of the present invention to further develop a brake pad of the above-mentioned type such that the frictional behavior of the friction elements is optimized and a more cost-effective production is permitted.

The integrated elasticity of shape of the carrier plate of the present disclosure improves the contact pattern as a whole and avoids, in particular, so-called "hot spots", an overstressing of areas as a result of non-uniform heating.

According to an advantageous further development of the present first type of brake pad, in which, corresponding to German Patent Document 197 09 962 C1, the friction elements are each fastened by tension springs on the carrier plate, a rigid connection subject to the risk of fracture between the two components is prevented. The risk of fracture would exist, for example, in the case of a riveted or welded connection, so that this connection represents a considerable improvement of the operational reliability.

This also applies to a second type of brake pad, in which, in addition to the rear-side tension spring, by means of which the respective friction element is fastened to the carrier plate, another spring element is arranged between the friction element and the carrier plate. The spring element rests in a receiving device of the carrier plate, which is built into the side facing the friction element.

The dimensions of the receiving device are such that the spring element with a round base plan rests in it in an axially as well radially secured manner.

The tension spring is prestressed such that the friction element is constantly clamped in, thus also in the relaxed position of the spring element.

In comparison to the partial deformability of the carrier plate of the first type of brake pad, the spring elements consisting of spring steel have a greater elasticity. When the spring elements are used, the carrier plate can be produced from a low-cost casting material or from low-strength steel sheet, whereby noticeable cost advantages are achieved.

Another contributing fact is that, in principle, only a few different components are present, specifically the carrier plate, the friction elements, the tensions springs and, in the case of the second type of brake pad, the spring elements. Furthermore, the simple construction permits an easy exchangeability of the friction elements because of wear, so that repair-caused interruptions of the operation can be kept extremely brief.

Such a modular construction of this brake pad also has the result that the friction element and spring components can be used unchanged, so that existing parts can be used without any problem. Thus, only the carrier plate has to be modified corresponding to the disclosure.

In principle, the carrier plate according to the present first type of brake pad can be produced by precision casting, which is particularly cost-effective. In addition to the construction as a cast steel or aluminum part, the construction as a deep-drawn steel sheet part is conceivable.

According to another concept of the disclosure, radial slots are made in the area of the ball sockets of the carrier plate. The radial slots provide the ball sockets with a certain elasticity perpendicular to the friction surface. Instead of the slots, which extend continuously from the ball socket to the rear side of the carrier plate, grooves can also be provided by means of which the desired elasticity can also be achieved.

In addition to the above-mentioned radial arrangement of the slots, other arrangements are also conceivable. The elasticity in each case is achieved by a partial weakening of the material of the carrier plate.

This is also the case in an embodiment in which the ball socket is constructed in the sense of a cup spring, viewed over the radius, the thickness of the material being constant or changed.

Instead of the above-mentioned locally limited elasticity of the carrier plate, a locally unlimited elasticity can be provided which occurs outside the ball socket.

For this purpose, it is conceivable to dimension the carrier plate to be thinner and to provide elevations in the form of knobs or the like in the overlapping area of the friction elements. The knobs or the like are used as a support for the friction elements.

As a result of a uniform course of the thickness of the carrier plate or a course which is changed in a defined manner, a more or less elastic deformation can be established in the contact area of the friction elements.

Slots or grooves in the carrier plate outside the ball sockets which are arranged in a defined manner permit a certain elasticity in the supporting areas for the friction elements.

A further development of the second type of brake pad of each spring element is constructed as a form spring and has a concentrically arranged ball socket in which the spherical-segment-shaped area of the element rests. As a result of this form closure, a radial fixing of the friction element is also achieved. This also exists when the corresponding area of the friction element is not spherical-segment-shaped but conical and the form spring is adapted thereto in its receiving area.

The form spring simultaneously has a stop by which its spring deflection is limited.

Instead of the form spring, a cup spring can be used as a spring element. Since a commercially available standard part can be used here, this variant represents a particularly cost-effective solution.

Here, a positioning of the friction element is achieved by the center bore of the cup spring, in which either the spherical area of the friction element or a cylindrical or conical attachment rests.

As a result of a local plasticizing because of occurring contact pressure forces, the edge area of the center bore can be pressed so far into the spherical or conical area of the friction element that a form closure, which is exact with respect to the measurements, and a play free fit is achieved virtually without machining.

Expediently, the diameter of the receiving device of the carrier plate in which the cup spring rests is smaller than the assigned dimension of the friction element. The edge area of the carrier plate adjacent to the receiving device forms a stop, on which the friction element rests in the end position. Thus, the carrier plate bounds the spring travel of the cup spring.

These and other aspects of the present disclosure will become apparent from the following detailed description of the disclosure, when considered in conjunction with accompanying drawings.

DETAILED DESCRIPTION OF THE DRAWINGS

Figure 1B:
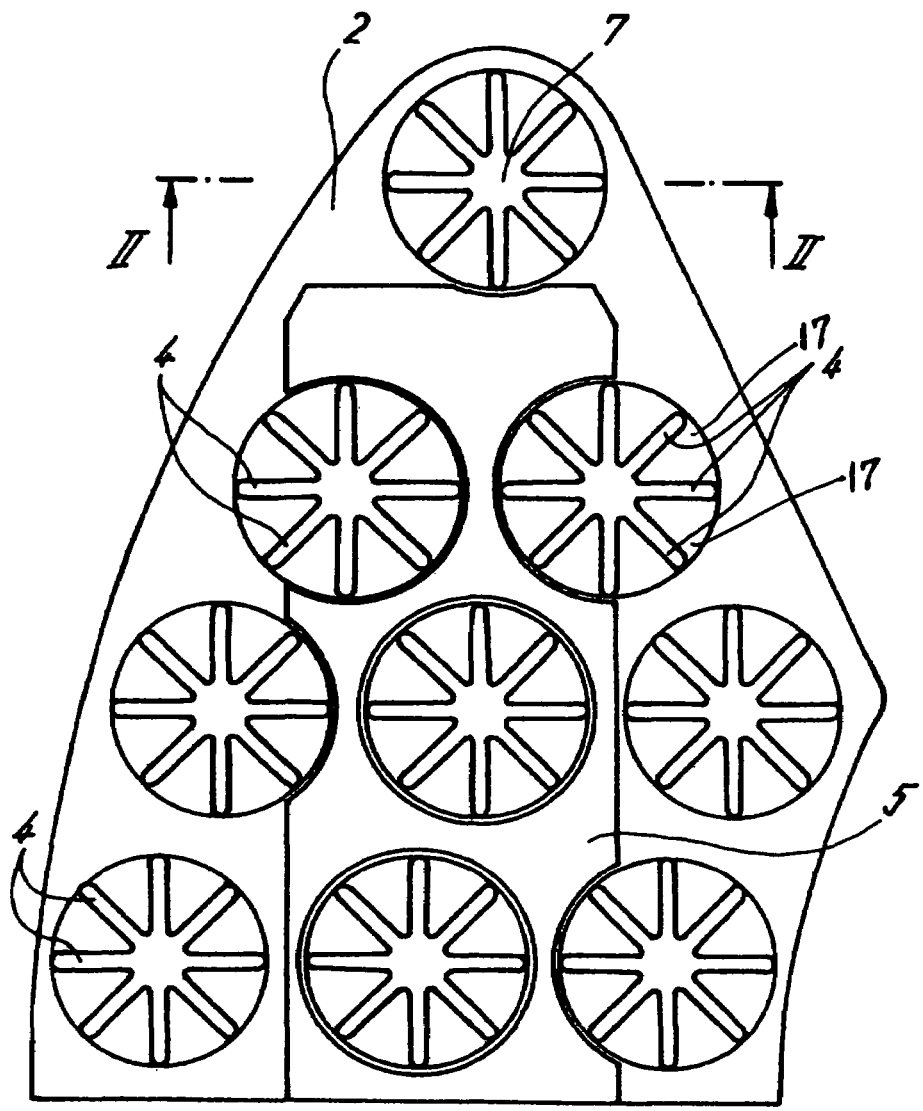
FIGS. 1A and 1B are end and bottom views, respectively, as a partial cutout of an embodiment of a first type of brake pad according to the present disclosure.

FIG. 1 illustrates a brake pad for a disc brake of a vehicle, particularly of a rail vehicle, which has a carrier plate 2 to which several friction elements 1 (FIG. 2) made of a friction material are fastened on a carrier metal sheet. The friction elements 1 can be pressed against the friction surface of a brake disc, which is not shown, when the brake is actuated.

Figure 2:
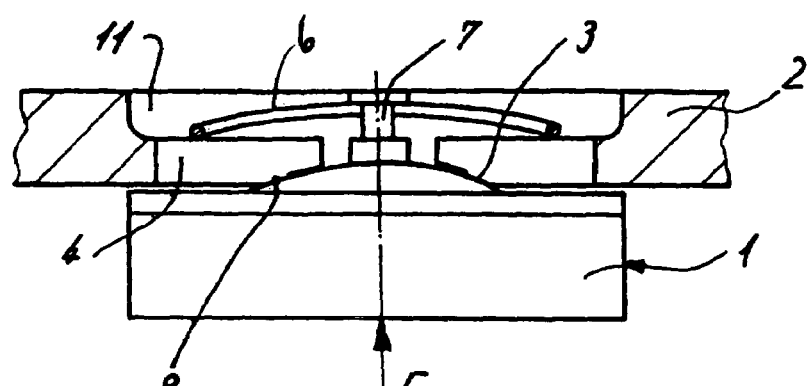
FIG. 2 is a sectional view of the brake pad according to Line II—II in FIG. 1.

As particularly clearly illustrated in FIG. 2, the friction elements 1 have a spherical-segment-shaped area 8 on their side facing the carrier plate 2. The area 8 rests in a ball socket 3 adapted thereto and provided in the carrier plate 2.

As an axial lengthening, a holding pin 7 is molded to the spherical-segment-shaped area 8. The holding pin 7 engages a ring-shaped tension spring 6 which is supported on the base of a rear-side recess 11 of the carrier plate 2.

As further illustrated in FIG. 1 but also in FIG. 2, radially arranged slots 4 are provided in the carrier plate 2 in the overlapping area of the friction elements 1. The slots 4 extend into the area of the ball socket 3, whereby the carrier plate 2 can be partially elastically deformed in the area defined thereby.

As a result of the radial arrangement of the slots 4, triangular webs 17 are in each case formed between two slots. The spherical-segment-shaped area 8 of the friction element 1 rests on the apex area of the webs 17. The reaction force F, which becomes effective when the brake is actuated, can deform the above-mentioned apexes within the elasticity range.

Figure 1A:
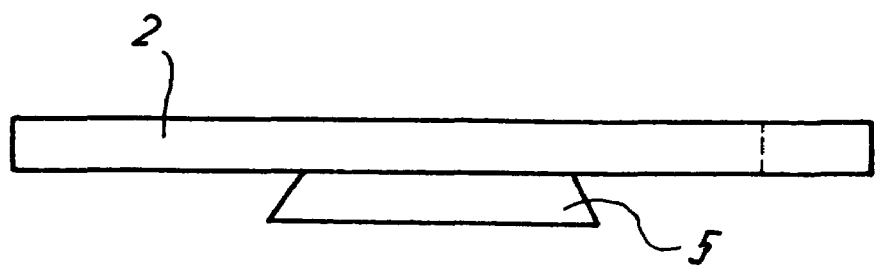

FIG. 1A illustrates a guide strip 5 of a dovetail guide provided on the rear side of the carrier plate 2. The brake pad can be held in a form-locking manner on a stationary component of the vehicle by the guide strip 5.

Figure 3:
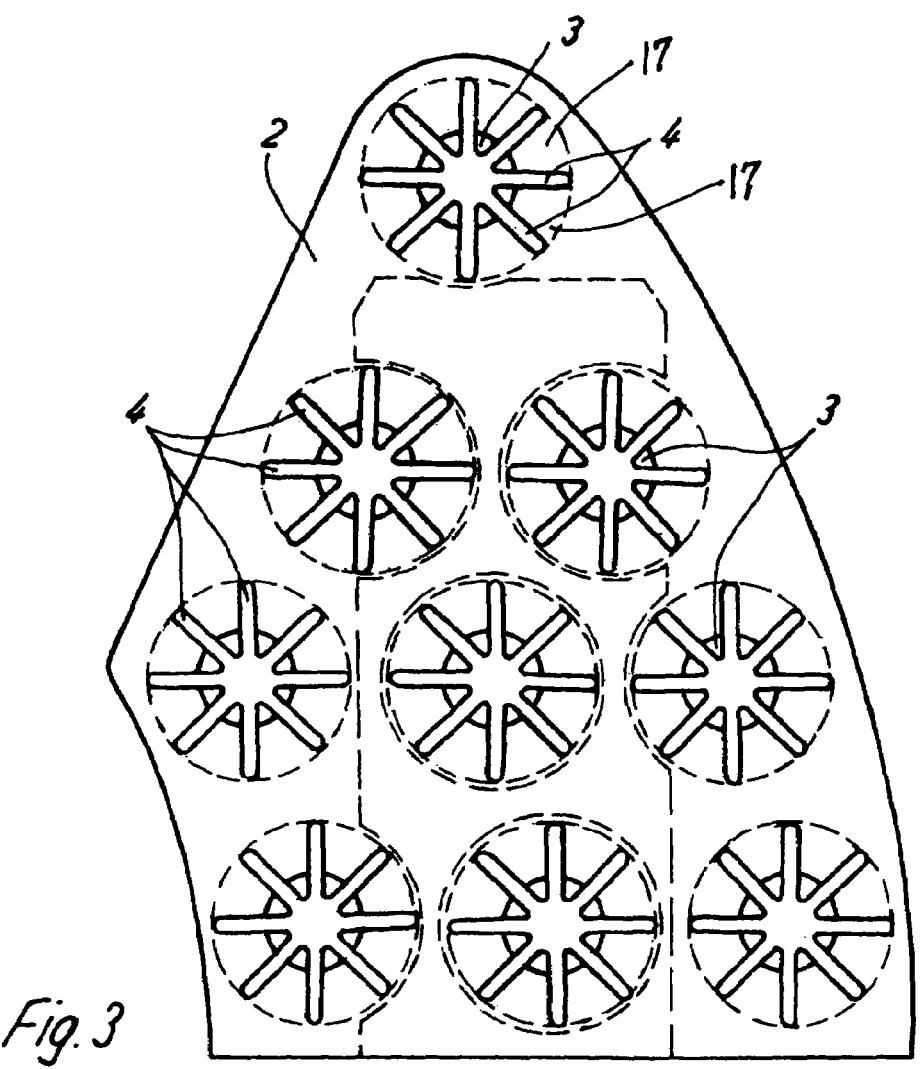
FIG. 3 is a top view of a partial cutout of the carrier plate according to FIG. 1 of the brake pad.

FIG. 3 only shows the carrier plate 2 with the provided recesses and the radial slots 4 in the ball sockets 3. The friction elements are not shown here.

Figure 4:
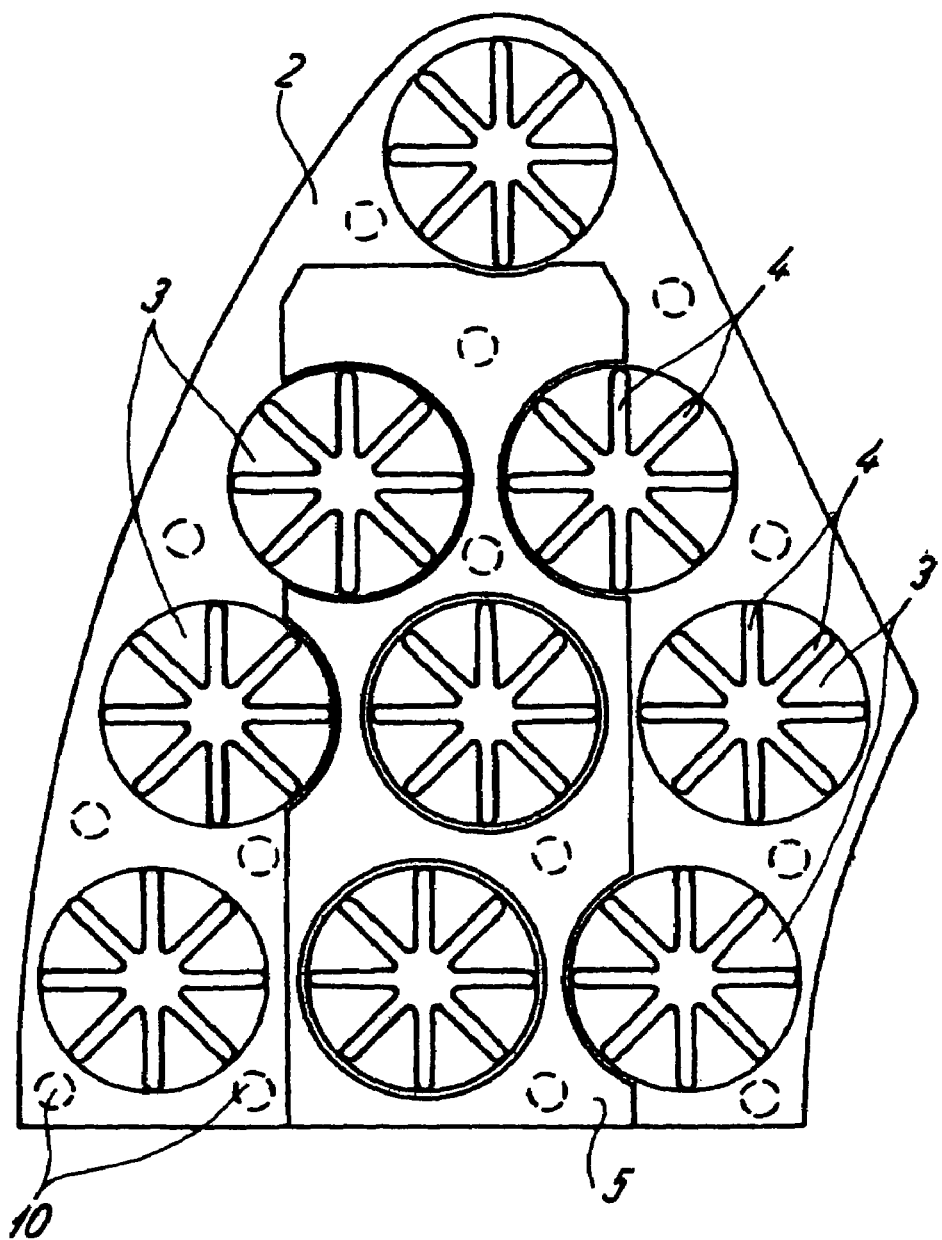
FIGS. 4 and 5 respectively are also rear views as a partial cutout of another embodiment of the first type of brake pad according to the present disclosure.

In the embodiment illustrated in FIG. 4, the carrier plate 2 is dimensioned with a smaller thickness.

In the overlapping area of the friction elements 1, projecting knobs 10 are arranged on the carrier plate 2. The friction elements rest against these knobs 10. The partially elastic deformability is formed by the knobs 10 interacting with the carrier plate 2 whose thickness is dimensioned to be smaller. In this case, the thickness of the carrier plate 2 may be constant, but may also differ in a defined manner, whereby a precisely definable elastic deformation is obtained.

Figure 5:
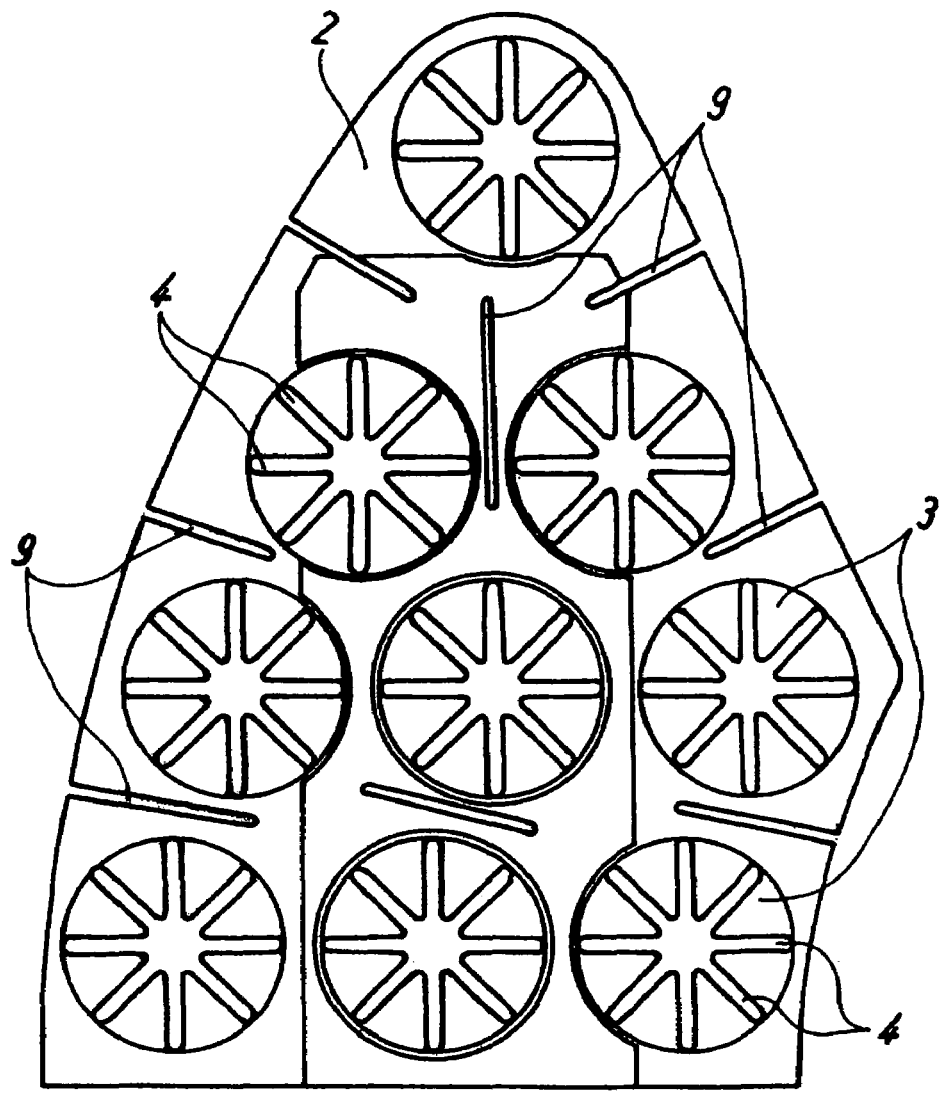

By means of the embodiment according to FIG. 5, an also locally unlimited elasticity of the carrier plate 2 can be achieved. In this case, slots 9, which are arranged in a defined manner, are made in the carrier plate 2. The slots 9 permit a corresponding deflection of the friction elements under stress.

Figure 6:
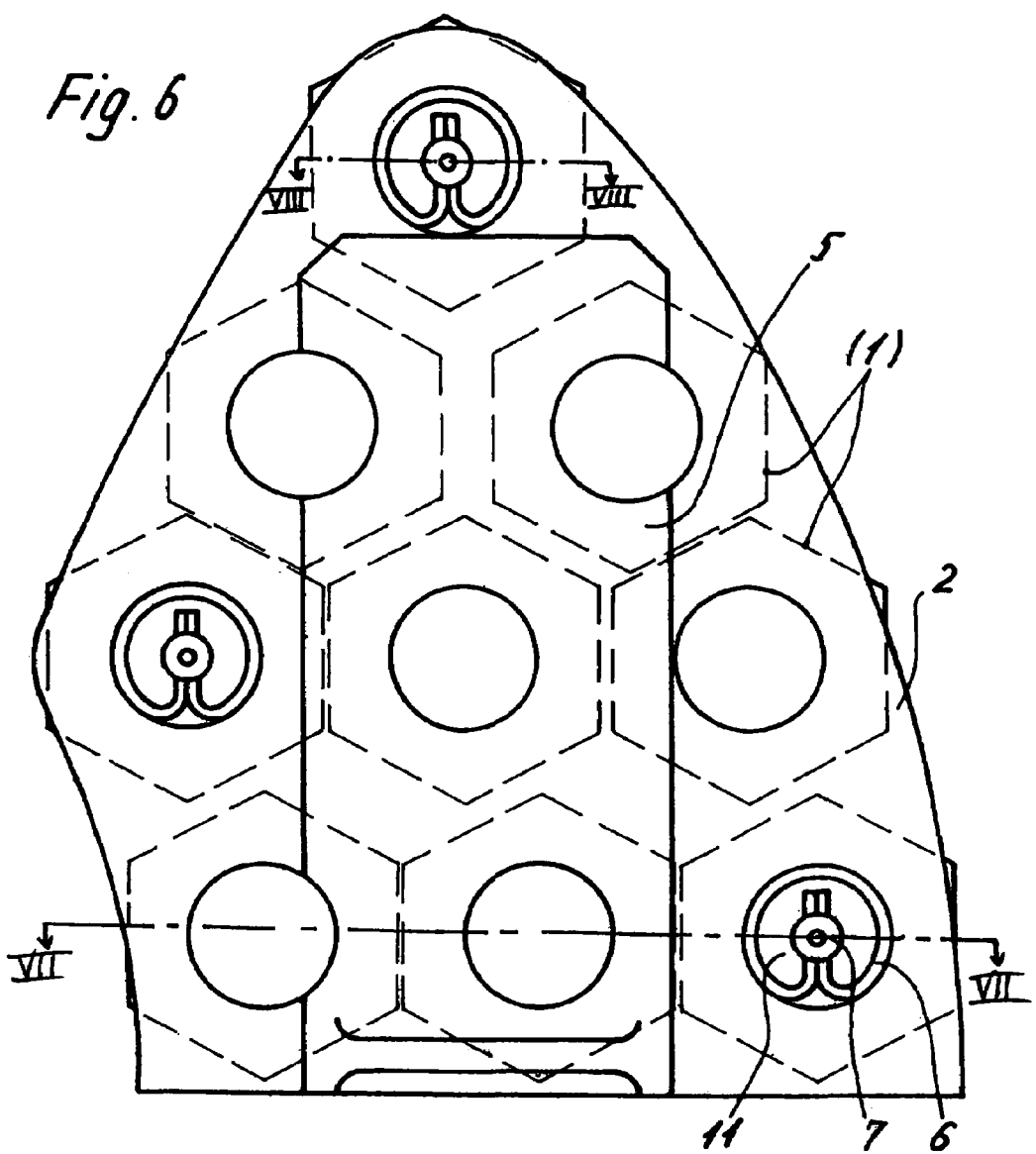
FIG. 6 is a rear view as a partial cutout of an embodiment of the second type of brake pad according to the present disclosure.

FIG. 6 shows a brake pad according to a second type whose basic construction corresponds to that illustrated in FIGS. 1 and 2.

However, in contrast, the carrier plate 2 has no partially elastically deformable areas, but has a receiving device 12, which is assigned to each friction element 1 and in which a spring element 13, 14 (FIGS. 8 and 9) rests. On the one side, the spring element 13, 14 is supported on the base of the receiving device 12 and, on the other side, is supported on the assigned friction element 1.

Figure 7:
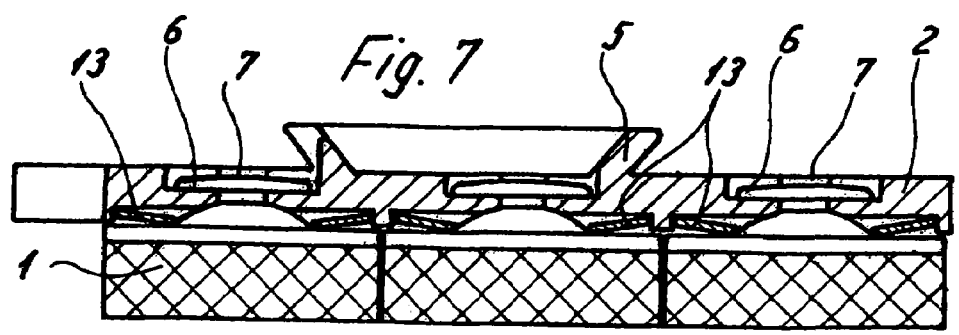
FIG. 7 is a sectional view of the brake pad according to Line VII—VII in FIG. 6.
Figure 8:
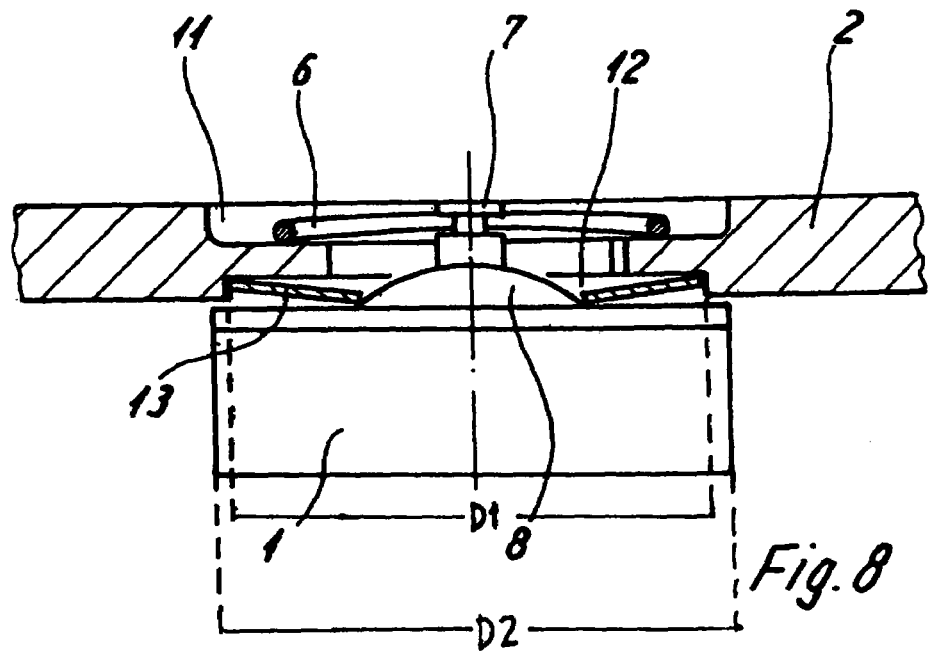
FIG. 8 is a sectional view of the brake pad according to Line VIII—VIII in FIG. 6.

In the embodiment illustrated in FIGS. 7 and 8, the spring element 13 is constructed as a cup spring which rests on the friction element 1 by the edge of its internal bore.

In this case, the depth of the receiving device or area 12 is smaller than the height of the relaxed cup spring 13, so that the friction element 1 extends at a short distance from the carrier plate 2.

Simultaneously, the base plan dimension D1 of the receiving device 12 is smaller than dimension D2 of the friction element 1. Thus the edge area of the carrier plate 2 adjoining the receiving device 12 forms a stop for the friction element 1 during the pressing-on in the direction of the carrier plate 2.

The inside diameter of the cup spring 13 corresponds approximately to the diameter of the spherical-segment-shaped area 8 at a location where the latter otherwise adjoins the friction element 1. As a result, a radial fixing of the friction element 1 is achieved.

The spring travel of the tension spring 6 is greater than the limited travel of the friction element 1. Thus, the friction element 1 is under spring tension even when it rests completely against the carrier plate 2.

Figure 9:
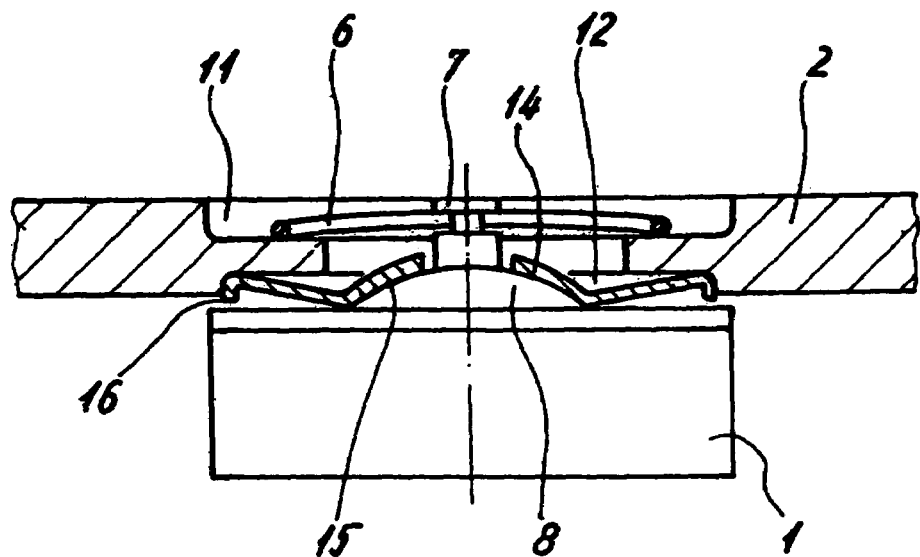
FIG. 9 is a partial sectional view of another embodiment of the second type of brake pad, corresponding to the sectional view in FIG. 8.

In FIG. 9, the spring element 14 is illustrated in the form of a form spring which has a concentrically arranged spherical-cap-type indentation 15 in which the spherical-segment-shaped area 8 of the friction element 1 rests in a centered manner.

Via the edge area bounding the indentation 15, the form spring 14 rests against the rear side of the friction element 1. The indentation 15 ensures a centering and a radial fixing of the friction element 1.

The outside diameter of the form spring 14, like that of the cup spring 12, corresponds to the outside diameter D1 of the receiving device 12, so cup spring 13 as well as the form spring 14 rest inside in a secured manner.

Furthermore, a collar 16 is provided which surrounds the form spring 14 and extends axially in the direction of the friction element 1. The collar 16 extends at a certain distance from the rear side of the friction element 1 and forms a stop for the spring travel of the indentation 15 during the operation-caused pressing-in.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A brake pad for a disc brake of a vehicle, comprising:
a carrier plate;
several friction elements, which, when a brake is actuated, can be pressed onto the friction surface of a brake disc the friction elements being fastened to the carrier plate adjacent a front side of the carrier plate;
tension springs supported on a rear side of the carrier plate facing away from the friction elements; and
the carrier plate being partially form-elastically deformable in an overlapping area of the friction elements; and
wherein each friction element rests in a ball socket provided in the carrier plate, and the ball socket is constructed at least in areas as a cup spring.

2. The brake pad according to claim 1, wherein, for the elastic deformability, slots or grooves are provided in the carrier plate.

3. The brake pad according to claim 2, wherein each friction element rests in a ball socket of the carrier plate, and the slots are arranged in a radially extending manner in the ball socket.

4. The brake pad according to claim 1, wherein partial thickenings, on areas which the friction elements rest, are provided in the overlapping area of the friction elements.

5. The brake pad according to claim 4, wherein the thickenings are constructed as knobs.

6. The brake pad according to claim 1, wherein the thickness of the carrier plate as a whole is one of identical and differs in a defined manner.

7. The brake pad according to claim 1, wherein, outside the overlapping area of the friction element, slots, which are arranged in a defined manner, are provided in the carrier plate.

8. The brake pad according to claim 1, wherein the carrier plate consists of a casting material selected from one of a cast steel and cast aluminum.

9. The brake pad according to claim 1, wherein the carrier plate consists of steel sheet.

10. The brake pad according to claim 1, wherein the carrier plate is constructed as a deep-drawn steel sheet part.

11. A brake pad for a disc brake of a vehicle, comprising:
a carrier plate;
several friction elements, which, when a brake is actuated, can be pressed onto the a friction surface of a brake disc the friction elements being fastened to the carrier plate adjacent a front side of the carrier plate;
tension springs supported on a rear side of the carrier plate facing away from the friction elements;
the carrier plate being partially form-elastically deformable in an overlapping area of the fiction elements;
wherein, for the elastic deformability, slots or grooves are provided in the carrier plate; and
wherein a thickness of areas, which are bounded by two slots respectively and form webs, is one of constant over the radius and differs over the radius.

12. A brake pad for a disc brake of a vehicle, comprising:
a carrier plate;
several friction elements, which, when a brake is actuated, can be pressed onto the a friction surface of a brake disc the friction elements being fastened to the carrier plate adjacent a front side of the carrier plate;
tension springs supported on a rear side of the carrier plate facing away from the friction elements;
a spring element for each friction element, which spring element is supported on one side on a back of the friction element and on another side on the front side of the carrier plate and forms a radial fixing of the friction element;
wherein the spring element is constructed as a cup spring; and
wherein the cup spring rests on the friction element by an edge bounding a center bore of the cup spring.

13. The brake pad according to claim 12, wherein each spring element rests in a receiving device provided in the front side of the carrier plate.

14. The brake pad according to claim 13, wherein the outside diameter of the receiving device is smaller than the largest base plan dimension of the friction element.

15. The brake pad according to claim 12, wherein the inside diameter of the cup spring corresponds approximately to the largest outside diameter of an attachment of the friction element, wherein the attachment is in the form of one of a spherical-segment-shaped area, a cylinder and a cone.

16. The brake pad according to claim 12, wherein the spring element is constructed as a form spring in which the friction element rests radially fixed on the rear side.

17. The brake pad according to claim 16, wherein the form spring has an indentation in which an attachment of the friction element rests.

18. The brake pad according to claim 17, wherein the indentation has one of a spherical-cap-shaped and conical construction.

19. The brake pad according to claim 17, wherein an edge area of the form spring bounding the indentation rests on the friction element.

20. The brake pad according to claim 19, wherein, relative to the base of the receiving device, the edge area bounding the indentation is higher than the collar.

21. The brake pad according to claim 12, wherein the spring elements consist of spring steel sheet.

22. A brake pad for a disc brake of a vehicle, comprising:
a carrier plate;
several friction elements, which, when a brake is actuated, can be pressed onto the a friction surface of a brake disc the friction elements being fastened to the carrier plate adjacent a front side of the carrier plate;
tension springs supported on a rear side of the carrier plate facing away from the friction elements;
a spring element for each friction element, which spring element is supported on one side on a back of the friction element and on another side on the front side of the carrier plate and forms a radial fixing of the friction element;
wherein each spring element rests in a receiving device provided in the front side of the carrier plate; and
wherein the depth of the receiving device is smaller than the height of an unstressed spring element.

23. A brake pad for a disc brake of a vehicle, comprising:
a carrier plate;
several friction elements, which, when a brake is actuated, can be pressed onto the a friction surface of a brake disc the friction elements being fastened to the carrier plate adjacent a front side of the carrier plate;
tension springs supported on a rear side of the carrier plate facing away from the friction elements;
a spring element for each friction element, which spring element is supported on one side on a back of the friction element and on another side on the front side of the carrier plate and forms a radial fixing of the friction element;
wherein the spring element is constructed as a form spring in which the friction element rests radially fixed on the rear side; and
wherein the form spring has an axially extending, circumferential collar which projects slightly beyond the carrier plate on the front side of the carrier plate facing the friction element.

24. The brake pad according to claim 23, wherein, relative to the base of the receiving device, the edge area bounding the indentation is higher than the collar.

25. A brake pad for a disc brake of a vehicle, comprising:
a carrier plate;
several friction elements, which, when a brake is actuated, can be pressed onto the a friction surface of a brake disc the friction elements being fastened to the carrier plate adjacent a front side of the carrier plate;
tension springs supported on a rear side of the carrier plate facing away from the friction elements;
a spring element for each friction element, which spring element is supported on one side on a back of the friction element and on another side on the front side of the carrier plate and forms a radial fixing of the friction element;
wherein the spring element is constructed as a form splint in which the friction element rests radially fixed on the rear side; and
wherein the diameter of a receiving device provided in the front side of the carrier plate corresponds to the outside diameter of the form spring.

26. The brake pad according to claim 25, wherein the outer base plan dimension of the form spring is smaller than the largest base plan dimension of the friction element.

\* \* \* \* \*